(No Model.)

E. M. HAND.
Manure-Rake.

No. 228,631.  Patented June 8, 1880.

WITNESSES:  
Chas. Nida  
C. Sedgwick

INVENTOR:  
E. M. Hand  
BY Munn & Co.  
ATTORNEYS.

UNITED STATES PATENT OFFICE.

EDWARD M. HAND, OF FREDERICKSBURG, IOWA.

MANURE-RAKE.

SPECIFICATION forming part of Letters Patent No. 228,631, dated June 8, 1880.

Application filed March 29, 1880. (No model.)

*To all whom it may concern:*

Be it known that I, EDWARD MICHEAL HAND, of Fredericksburg, in the county of Chickasaw and State of Iowa, have invented a new and useful Improvement in Manure-Rakes, of which the following is a specification.

My invention relates to a device for collecting manure from various points and conveying it to a compost-heap or a wagon or other place of deposit.

The invention consists in a novel construction of a rake and the combination therewith of two hinged curved arms connected to a draft-bar, and two pivoted straight arms serving as handles, whereby provision is made for adjusting the rake to different positions and for tilting it to discharge the load.

Figure 1:
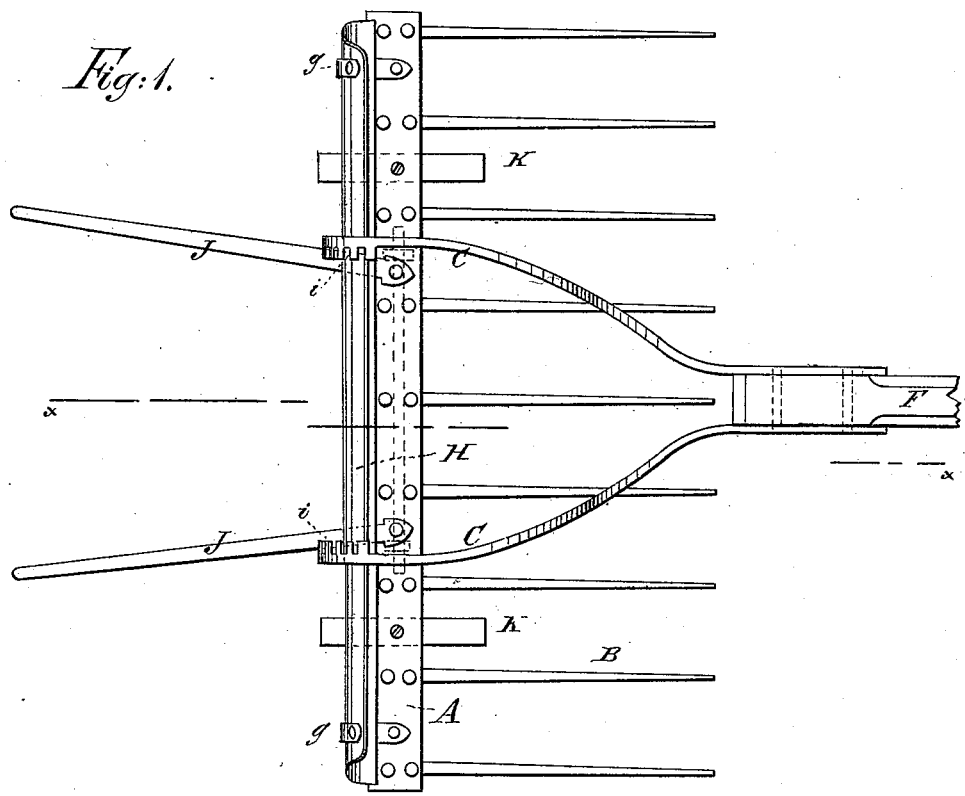
Figure 2:
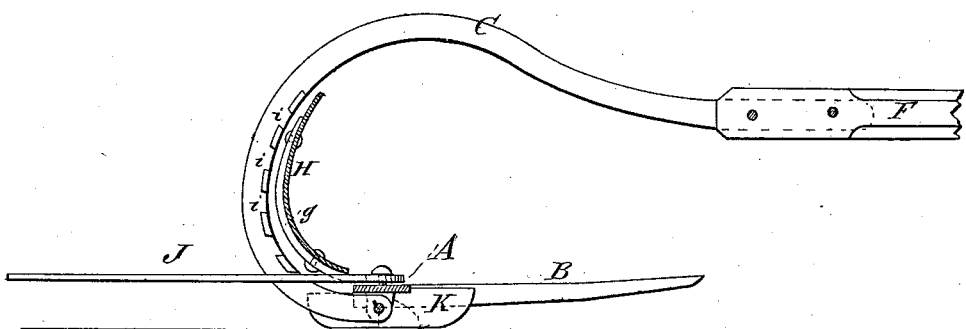

In the accompanying drawings, Figure 1 is a top view of a rake embodying my improvements, and Fig. 2 is a vertical section taken in the line $x$ $x$, Fig. 1.

The rake may be drawn by hand or horse power, and it may be of any suitable size, according to the manner in which it is to be used.

The rake consists of a flat bar, A, and tines B, having their shanks bolted or riveted to the bar.

C C represent two arms which are curved in a form resembling a sickle. The rear and lower ends of these arms are hinged to the under side of the bar A by means of a bolt, $e$, passing through them and through lugs $d$ attached to the bar. The upper and front ends of the arms C are bent toward each other and fastened to a tongue or draft-bar, F.

To the upper side of the bar A is attached a sheet metal curved plate, H, by means of arms $g$ bolted to the bar A, which plate H serves as a back for the rake.

J J represent two straight bars having their front ends pivoted to the bar A, so that they may be oscillated horizontally to engage with notches $i$ on the inner edge of the curved portion of the arms C in rear of the plate H. These bars J serve as the handles of the implement. The rake is provided with wooden runners K.

In using this implement the driver grasps the handles J J with his hands and engages them with suitable notches $i$ to give the tines B the desired angle of inclination. The rake is then drawn along so as to gather the manure and collect it against the back plate H. When the rake is full the handles J are withdrawn from the notches $i$ and elevated so as to tilt the rake and deposit the contents.

Having thus described my invention, I claim as new and desire to secure by Letters Patent—

The combination, with the rake A B, of the notched and hinged arms C C, bent over to connect with draft-bar F, the back plate, H, the pivoted straight bars J J, and the runners K K, all arranged to form a manure-fork, as shown and described.

EDWARD MICHEAL HAND.

Witnesses:
  GEORGE GREMS,
  THOMAS MALOY.